United States Patent [19]
Cady

[11] Patent Number: 5,211,089
[45] Date of Patent: May 18, 1993

[54] CAM-CONTROLLED TUBE END FINISHING APPARATUS AND METHOD

[75] Inventor: Albert B. Cady, New Alexandria, Pa.

[73] Assignee: Westinghouse Electric Corp., Pittsburgh, Pa.

[21] Appl. No.: 708,573

[22] Filed: May 31, 1991

[51] Int. Cl.$^5$ .......................... B23B 1/00; B23B 5/16
[52] U.S. Cl. .......................................... 82/47; 82/19; 82/48; 82/123
[58] Field of Search ............... 82/1.11, 17, 19, 118, 82/123, 113, 70.1, 47, 46, 48, 101

[56] References Cited

U.S. PATENT DOCUMENTS

| | | | |
|---|---|---|---|
| 2,350,535 | 6/1944 | Sarulla | 82/92 X |
| 3,127,802 | 4/1964 | Zierden | 82/159 |
| 4,165,661 | 8/1979 | Wasco, Jr. et al. | 82/17 X |
| 4,486,131 | 12/1984 | Eckle | 82/158 X |

FOREIGN PATENT DOCUMENTS

1414503  8/1988  U.S.S.R. .................. 82/1.11

Primary Examiner—Z. R. Bilinsky

[57] ABSTRACT

A cam-controlled tube end finishing apparatus includes a cutting bit having multiple cutting faces, a platform supporting the cutting bit adjacent to the end of a rotating hollow tube, and a pair of cam-controlled mechanisms for moving the platform and thereby the cutting bit relative to the end of the rotating tube along a closed polygonal path of travel for severing the tube end. An initial portion of the rotating tube is severed in a direction from the outside to the inside of the tube at an angle to a plane normal to the rotational axis of the tube so as to define an initial cut face on the tube end extending in inclined relation to a plane normal to the rotational axis of the tube. A final portion of the rotating tube is severed in a direction from the inside to the outside of the tube at another angle to a plane normal to the rotational axis of the tube so as to provide a substantially burr-free cut face on the tube end extending in a plane normal to the rotational axis of the tube.

22 Claims, 6 Drawing Sheets

CAM-CONTROLLED TUBE END FINISHING APPARATUS AND METHOD

BACKGROUND OF THE INVENTION

1. Field of the Invention

The present invention relates generally to the manufacture of metal tubing, such as zirconium tubes, for use in fuel rods of nuclear fuel assemblies and, more particularly, is concerned with a cam-controlled apparatus and method for finishing the end of the fuel rod tube.

2. Description of the Prior Art

One conventional technique for manufacturing zirconium tubes for nuclear fuel rods involves pilgering a length of stock tubing to produce an elongated section having precise dimensions. Then, the section of tubing is removed from the pilgering mill and cut into shorter lengths approaching the required length for use in nuclear fuel rods.

Thereafter, the tubes undergo many processing steps before tube manufacture is completed. One processing step is the finishing of the end of the tube to provide the tube with the precise length required for a nuclear fuel rod and to remove burrs from the tube end.

Presently, the tube end is severed, or trimmed, by a cutoff wheel which operates at ninety degrees to the tube axis and produce burrs on the inside diameter of the tube. Then, the face of the end of the tube is ground with a square or rectangular tool whose grinding surface extends parallel to the end face and is moved toward the end face along the axis of the tube. Such mode of operation causes the burrs on the inside diameter of the tube to roll back and not be removed.

Beside the serious shortcoming of leaving inside burrs, the present finishing operation also has the added shortcoming of depending on the skill of an operator in properly performing many adjustments to correctly set the feed rate of the equipment performing these operations. Another shortcoming is that the present equipment is not isolated from the finishing operation and so it is possible for grit and foreign matter to enter the equipment and contaminate its moving parts requiring periodic cleaning and adjustment.

Consequently, a need exists for improvement of present finishing operation in a way that substantially eliminates the necessity for operator skill and intervention and avoids the contamination of the equipment by the finishing operation.

SUMMARY OF THE INVENTION

The present invention provides a cam-controlled tube end finishing apparatus and method designed to satisfy the aforementioned needs. The tube end finishing apparatus and method utilize a triangular multi-faced cutting bit that is moved along a closed polygonal path of travel in the following cam-controlled legs of the path: cutting, traversing, facing, and retracting. This cam-controlled path of travel of the cutting bit provides an inside and outside burr-free, clean finish on the tube end face. Additionally, by being controlled by the lobes of cams, the apparatus requires no manual adjustments by an operator, except merely the periodic replacement of the cutting bit, thus reducing the potential for human error. The cams provide accurate, repeatable cutting movement and permit use of closed housings that prevent foreign matter from entering the apparatus.

Accordingly, the present invention is directed to an apparatus for finishing an end of a rotating hollow tube, comprising: (a) a cutting bit; (b) means for supporting the cutting bit adjacent to the end of the rotating tube; and (c) means for moving the supporting means and thereby the cutting bit relative to the end of the rotating tube along a closed polygonal path of travel for severing the tube end. The moving means is operable to move the supporting means and thereby the cutting bit to sever an initial portion of the rotating tube in a direction from the outside to the inside of the tube at an angle to a plane normal to the rotational axis of the tube so as to define an initial cut face on the tube end extending in inclined relation to a plane normal to the rotational axis of the tube. The moving means is also operable to move the supporting means and thereby the cutting bit to sever a final portion of the rotating tube in a direction from the inside to the outside of the tube at another angle to a plane normal to the rotational axis of the tube so as to provide a final cut face on the tube end extending in a plane normal to the rotational axis of the tube.

More particularly, the cutting bit has multiple cutting faces with a different one of the faces being employed in severing the initial portion of the rotating tube than is used in severing the final portion thereof. The supporting means is a movable platform. The moving means includes a pair of upper and lower slide mechanisms, and means for actuating the upper and lower slide mechanisms. The upper slide mechanism mounts the platform and is actuatable to move the platform and the cutting bit therewith along the closed path of travel. The lower slide mechanism mounts the upper slide mechanism and is actuatable to actuate the upper slide mechanism and thereby to move the platform and the cutting bit therewith along the closed path of travel.

The slide mechanism actuating means includes a rotatable drive shaft, a pair of upper and lower cams, and a pair of upper and lower cam followers. The upper and lower cams are mounted one above the other to the drive shaft for rotation therewith and in alignment with the upper and lower slide mechanisms. Each cam has a peripheral lobe thereon. The upper and lower cam followers are respectively mounted to the upper and lower slide mechanisms and engaged with the peripheral lobes on the cams. The peripheral lobes are configured to move the cam followers and actuate the upper and lower slide mechanism so as to cause movement of the cutting bit along the closed path of travel. The finishing apparatus also includes a housing disposed in sealed stationary relationship with respect to the movable platform. The housing defines a chamber for containing the upper and lower slide mechanisms and the cams and cam followers in isolated relationship with respect to the cutting bit.

The present invention also is directed to a method for finishing an end of a rotating hollow tube which comprises the steps of: (a) supporting a cutting bit adjacent to the end of the rotating tube; and (b) moving the cutting bit relative to the end of the rotating tube along a closed polygonal path of travel for severing the tube end. In one portion of the path of travel, the cutting bit severs an initial portion of the rotating tube in a direction from the outside to the inside of the tube at an angle to a plane normal to the rotational axis of the tube so as to define an initial cut face on the tube end extending in inclined relation to a plane normal to the rotational axis of the tube. In another portion of the path of travel, the cutting bit severs a final portion of the rotating tube in a direction from the inside to the outside of the tube at another angle to a plane normal to the rotational axis of the tube so as to produce a final cut face on the tube end extending in a plane normal to the rotational axis of the tube.

More particularly, the closed polygonal path of travel of the cutting bit includes serially connected cutting, traversing, facing, and retracting legs. In the cutting leg of the path, the cutting bit is moved from a home position, and the end of the rotating tube is severed from outside to inside, at an acute angle to a plane normal to the rotational axis of the tube. In the traversing leg of the path, the cutting bit is moved toward the rotational axis of the tube along a plane normal to the rotational axis of the tube. In the facing leg of the path, the cutting bit is moved, and the end of the rotating tube is severed from inside to outside, at an acute angle to a plane normal to the rotational axis of the tube so as to provide a substantially burr-free cut face on the tube end extending along a plane normal to the rotational axis of the tube. In the retracting leg of the path, the cutting bit is moved away from the rotational axis of the tube back to the home position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Figure 1:
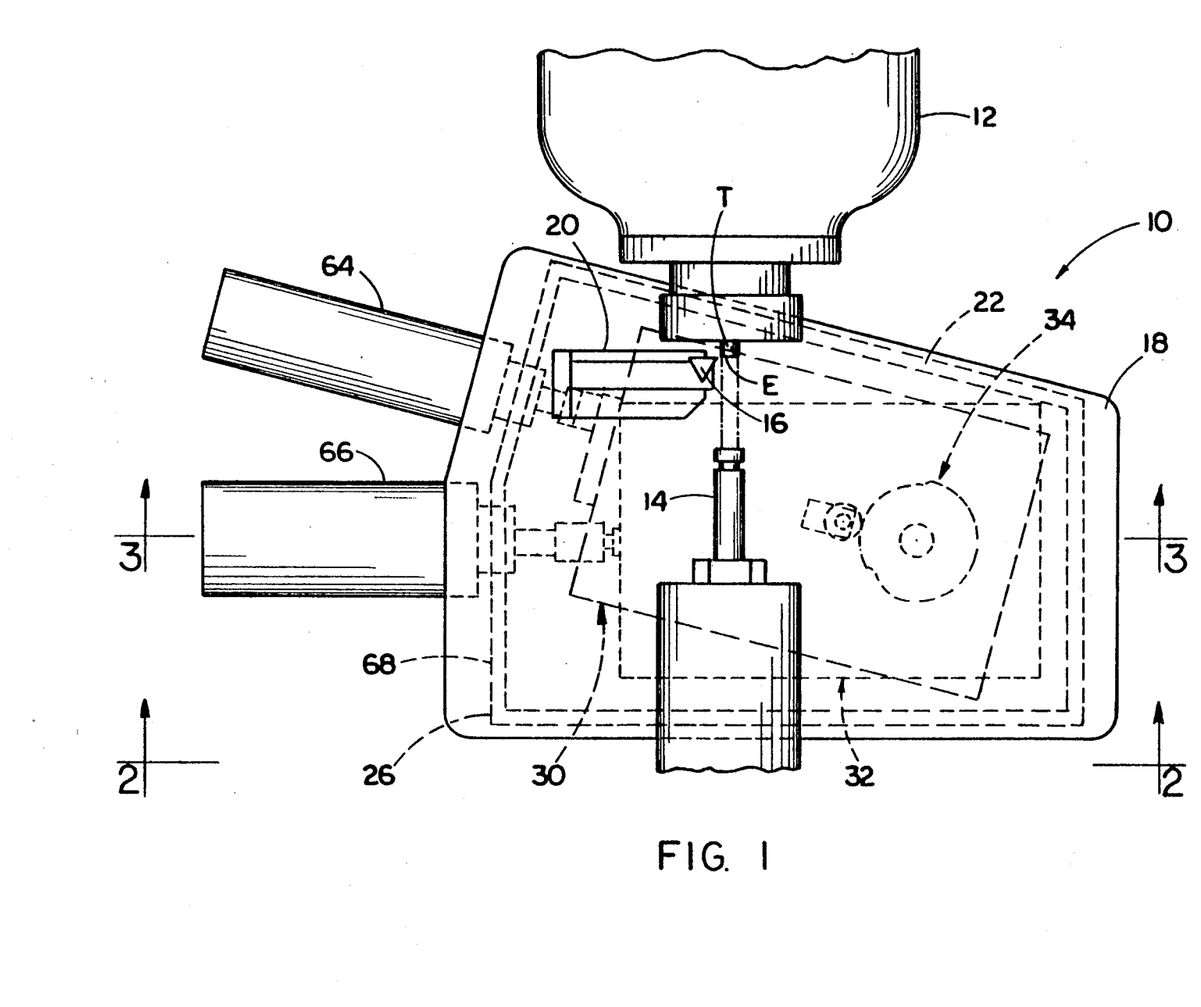
FIG. 1 is a top plan view of a cam-controlled tube end finishing apparatus in accordance with the present invention.
Figure 2:
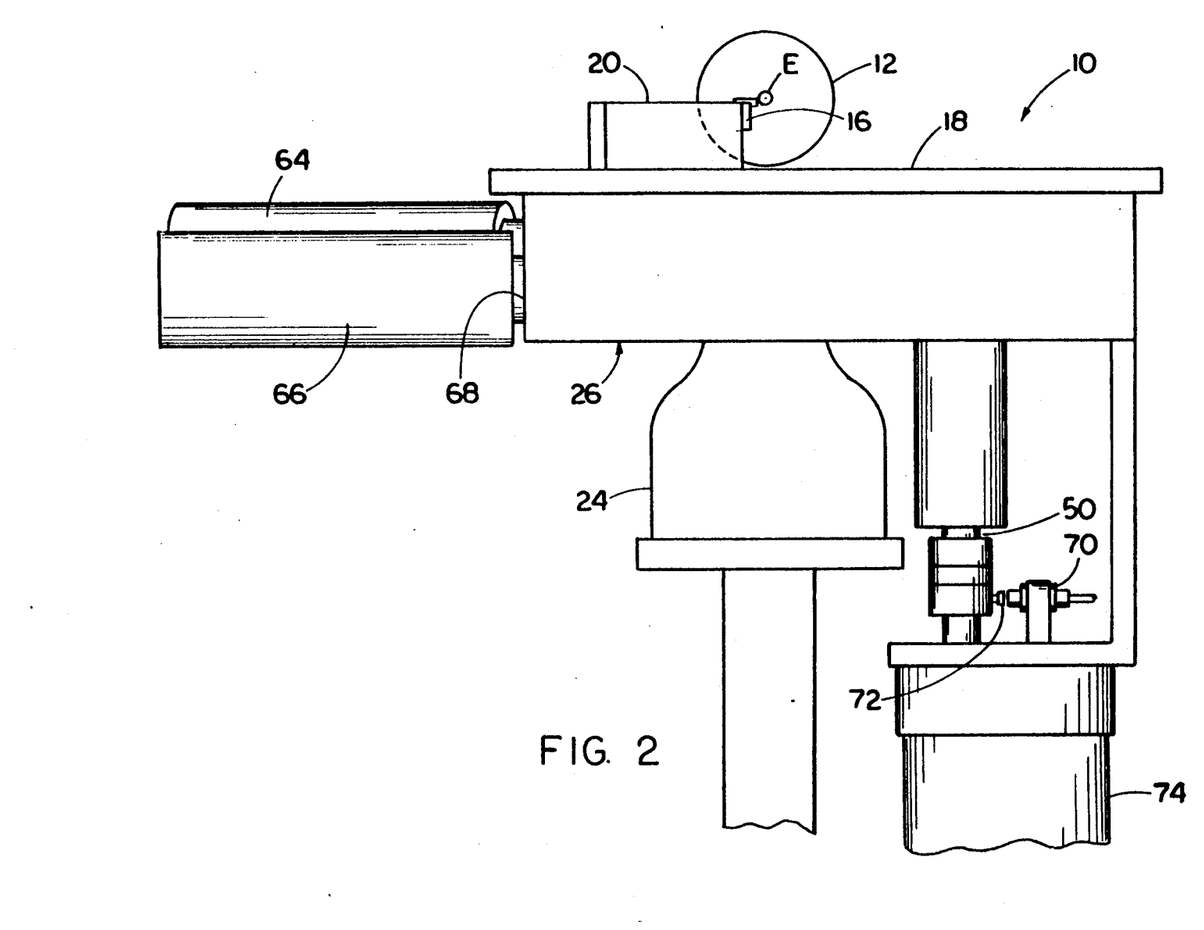
FIG. 2 is an end elevational view of the apparatus as seen along line 2—2 of FIG. 1.
Figure 3:
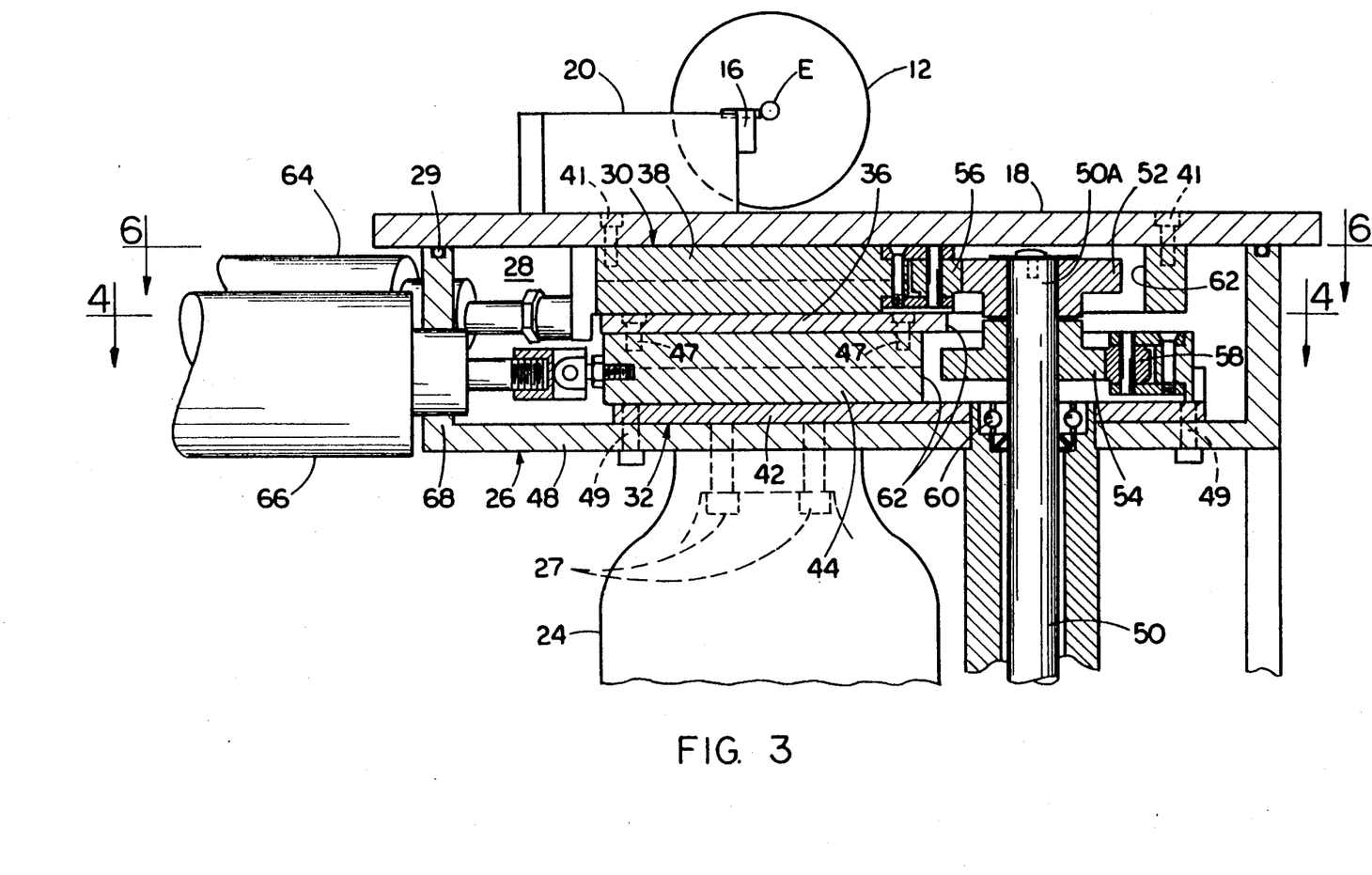
FIG. 3 is a sectional view of the apparatus taken along line 3—3 of FIG. 1.
Figure 4:
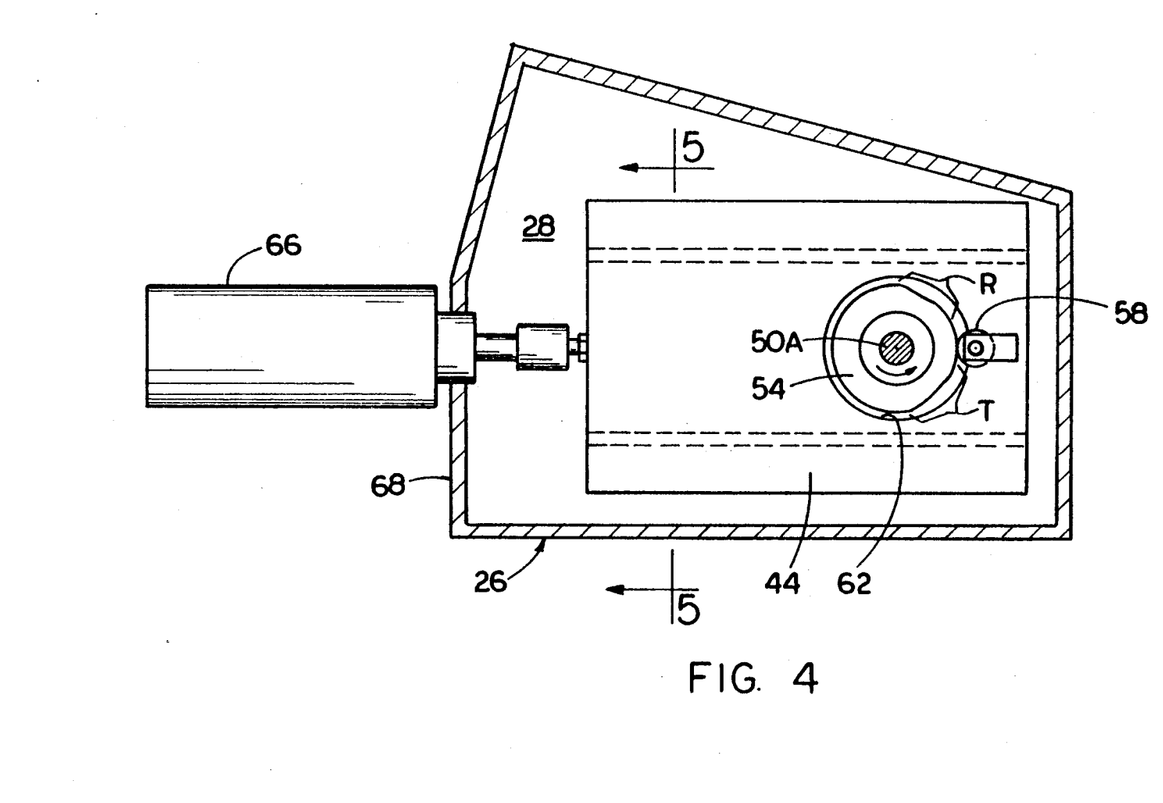
FIG. 4 is a top plan view of a lower slide mechanism of the apparatus as seen along line 4—4 of FIG. 3.

Referring now to the drawings, and particularly to FIGS. 1-3, there is shown a cam-controlled tube end finishing apparatus of the present invention, being generally designated 10. The finishing apparatus 10 is located adjacent to a conventional chuck 12 which mounts, and is operable to rotate, a tube T whose end E is to be cut in the finishing operation performed by the apparatus 10 to precisely establish a desired length for the tube T. Also, a conventional stop 14 shown in FIG. 1 is used to gauge the desired length to which the tube T is to be cut. The chuck 12 and stop 14 are not part of the apparatus 10 of the present invention.

In its basic components, the finishing apparatus 10 includes a cutting bit 16 having multiple cutting faces 16A, 16B, 16C, and a movable platform 18 having a tool holder 20 thereon supporting the cutting bit 16 adjacent to the end E of the tube T to be finished, and means 22 for moving the platform 18 and tool holder 20 therewith and thereby the cutting bit 16 relative to the end E of the rotating tube T along a closed polygonally-shaped path of travel P (see FIG. 8) for severing and thus finishing the tube end E. The finishing apparatus 10 also includes a base 24 stationarily mounting a housing 26 by fasteners 27. The housing 26 is disposed in sealed relationship by a seal ring 29 with the movable platform 18 and defines an interior chamber 28. The components of the platform moving means 22, to be described hereinafter, are contained within the chamber 28 in an isolated relationship with respect to the cutting bit 16 which protects the components from contamination and fouling by pieces of metal cut from the tube end E during the finishing operation.

Figure 5:
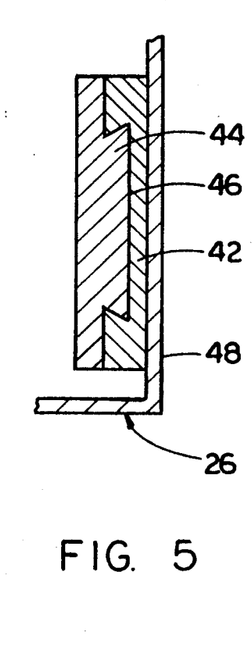
FIG. 5 is a sectional view of the lower slide mechanism taken along line 5—5 of FIG. 4.
Figures 6, 7:
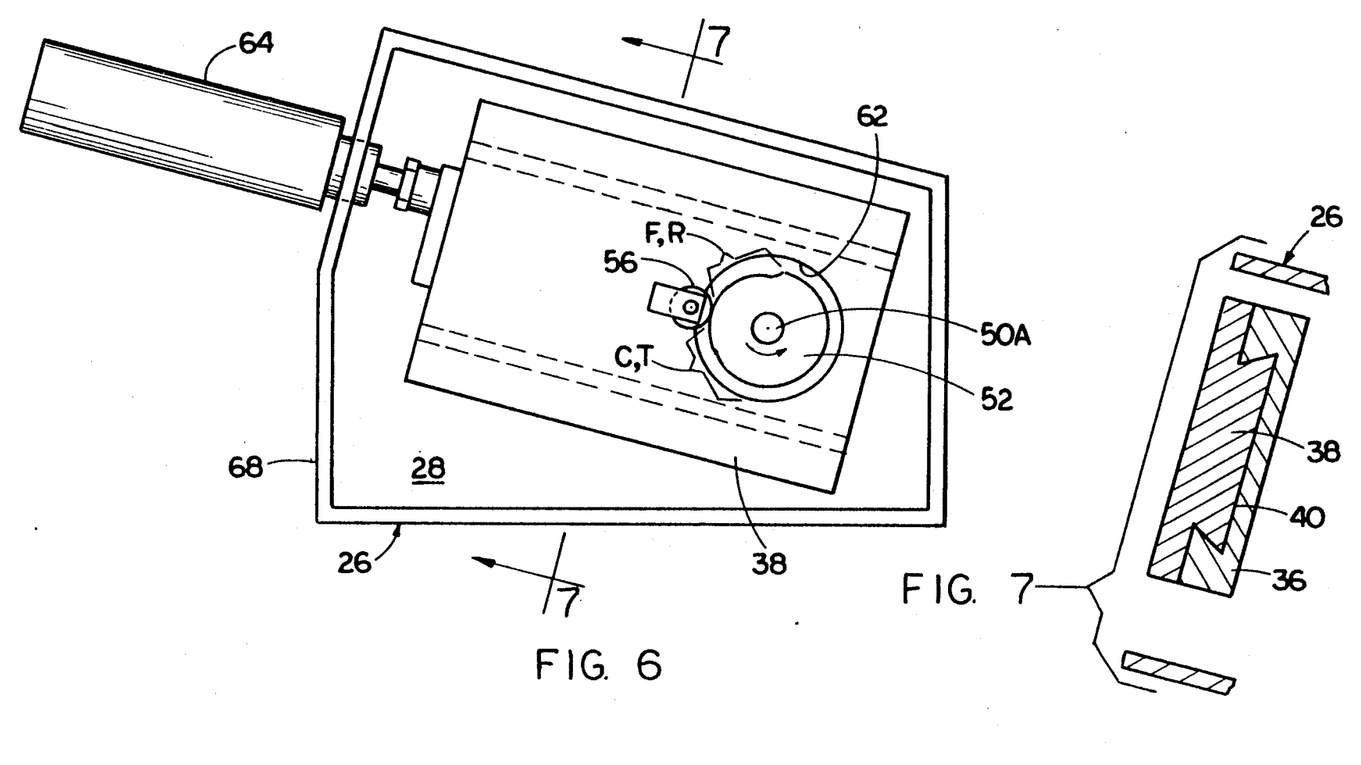
FIG. 6 is a top plan view of an upper slide mechanism of the apparatus as seen along line 6—6 of FIG. 3.
FIG. 7 is a sectional view of the upper slide mechanism taken along line 7—7 of FIG. 6.

More particularly, referring to FIGS. 1-7, the platform moving means 22 includes a pair of upper and lower slide mechanisms 30, 32, and means 34 for actuating the upper and lower slide mechanisms 30, 32. The upper slide mechanism 30 includes a lower plate 36 and an upper plate 38 mounted to the lower plate 36 for reciprocal movement relative thereto. As seen in FIG. 7, a dovetail connection 40 is provided between the lower plate 36 and upper plate 38 for permitting such reciprocal movement.

The lower slide mechanism 32 includes a bottom plate 42 and a top plate 44 mounted to the bottom plate 2 for reciprocal movement relative thereto. As seen in FIG. 5, another dovetail connection 46 is provided between the bottom plate 42 and top plate 44 for permitting such reciprocal movement. The bottom plate 42 is stationarily mounted and fixed by fasteners 47 on a bottom wall 48 of the housing 26 within the interior chamber 28. The top plate 44 fixedly mounts, by fasteners 49, the lower plate 36 of the upper slide mechanism 30 for movement with the top plate 44. Actuation of the upper slide mechanism 30 moves the upper plate 38 thereof and thereby the platform 18 and the cutting bit 16 therewith along the closed polygonal path of travel P. Actuation of the lower slide mechanism 32 moves the top plate 44 thereof and therewith the upper slide mechanism 30 along the closed polygonal path of travel P.

Referring to FIGS. 1-3, 4 and 6, the means 34 for actuating the slide mechanisms 30, 32 includes a rotatable vertical drive shaft 50, a pair of upper and lower cams 52, 54 mounted one above the other to the drive shaft 50 for rotation therewith, and a pair of upper and lower cam followers 56, 58. The bottom wall 48 of the housing 26 contains a bearing 60 which rotatably mounts the drive shaft 50 adjacent to its upper portion 50A. The upper portion 50A of the shaft 50 and the upper and lower cams 52, 54 attached thereto are disposed through the respective circular openings 62 formed in the plates 36, 38 and 42, 44 of the upper and lower slide mechanisms 30, 32. The upper and lower cam followers 56, 58 are respectively mounted to the upper and top plates 38, 44 of the upper and lower slide mechanisms 30, 32 and extend into the openings 62 and engage the peripheries of the cams 52, 54. The peripheries of the cams 52, 54 have predetermined peripheral lobes being configured to move the cam followers 56, 58 and the upper and top plates 38, 44 of the upper and lower slide mechanisms 30, 32 so as to cause movement of the platform 18 and the cutting bit 16 along the closed polygonal path of travel P in the desired manner.

Also, the upper and lower slide mechanisms 30, 32 include respective upper and lower pneumatic cylinders 64, 66 mounted to a side wall 68 of the housing 26. The upper and lower cylinders 64, 66 are connected through the housing side wall 68 to the corresponding upper and top plates 38, 44 of the upper and lower slide mechanisms 30, 32. The upper cylinder 64 is operable to constantly impose a pushing force on the upper plate 38 and the lower cylinder 66 is operable to constantly impose a pulling force on the top plate 44 for biasing the upper and lower cam followers 56, 58 mounted to the respective upper and top plates 38, 44 continually in engagement with the corresponding upper and lower cams 52, 54. The configurations of the lobes on the peripheries of the cams 52, 54 will control the movements of the cam followers 56, 58 and therewith the upper and top plates 38, 44 during each revolution of the drive shaft 50. The drive shaft 50 only rotates one revolution for each tube end E that is finished. A proximity sensor 70 located adjacent the shaft 50 senses the presence of a bolt 72 on the shaft for controlling operation of a motor 74 to only drive the shaft 50 through a single revolution at one time.

Figure 8:
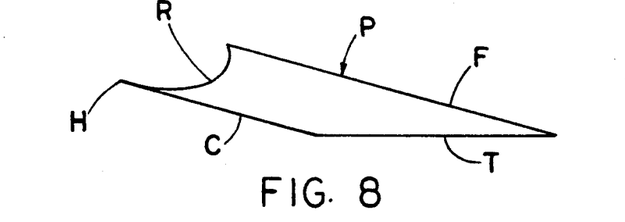
FIG. 8 is a diagram of a closed path of travel of a cutting bit of the apparatus of FIG. 1.
Figure 9:
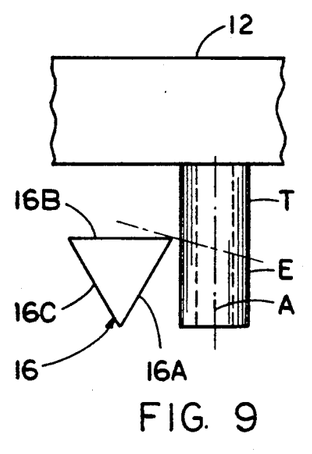
FIG. 9 is a schematic view of the cutting bit at the start of a cutting leg of the path of travel of the bit.
Figure 10:
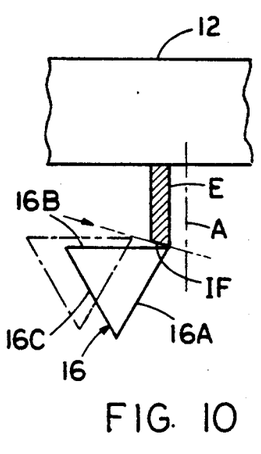
FIG. 10 is a schematic view of the cutting bit at the end of the cutting leg and the start of the traversing leg of the path o travel of the bit.
Figure 11:
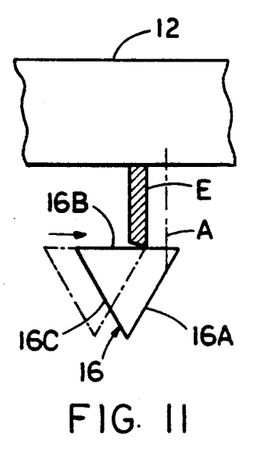
FIG. 11 is a schematic view of the cutting bit at the end of the traversing leg and the start of the facing leg of the path of travel of the bit.
Figure 12:
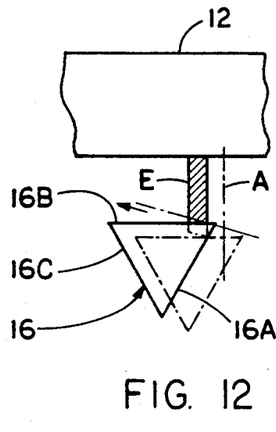
FIG. 12 is a schematic view of the cutting bit at the end of the facing leg and the start of the retracting leg of the path of travel of the bit.
Figure 13:
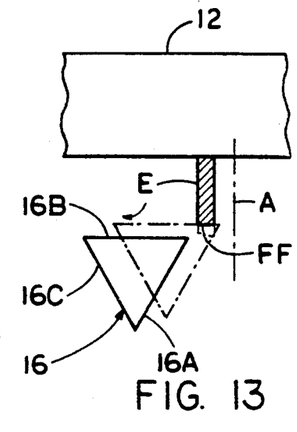
FIG. 13 is a schematic view of the cutting bit at the end of the retracting leg and start of the traversing leg of the path of travel of the bit.

Referring to FIG. 8, there is illustrated a diagram of a closed polygonal path of travel P of the cutting bit 16 of the finishing apparatus 10 of FIG. 1 which results from each cycle of operation of the drive shaft 50 and the upper and lower slide mechanisms 30, 32. As depicted in FIG. 8, the closed polygonal path of travel P of the cutting bit 16 includes serially connected cutting, traversing, facing (or recutting), and retracting (or returning) legs C, T, F and R. The lobes of the upper and lower cams 52, 54 for causing movement of the cutting bit 16 are identified with the same letters in FIGS. 6 and 4.

Referring to FIG. 9-13, there is schematically illustrated the steps of the method of operation of the apparatus 10 for finishing the end E of the rotating hollow tube T. With the cutting bit 16 initially supported at the home portion H adjacent to the end E of the rotating tube T, as seen in Figs, 1, 8 and 9, the upper plate 38 of the upper slide mechanism 30 is first moved, causing the cutting bit 16 to be moved toward the end E of the rotating tube T along the cutting leg C of the path P, from the home position H, as shown in solid line form in FIG. 9 and dashed line form in FIG. 10, toward the rotational axis A of the rotating tube T and to the solid line position shown in FIG. 10. Such movement of the cutting bit 16 causes its face 16A to sever an initial portion of the end E of the rotating tube T in a direction from the outside to the inside of the tube end E at an acute angle, such as fifteen degrees, to a plane normal to the rotational axis A of the rotating tube T and thereby define an initial face IF on the tube end E extending inclined relative to the normal plane.

Next, both the upper plate 38 of the upper slide mechanism 30 and top plate 44 of the lower slide mechanism 32 are moved so as to cause the cutting bit 16 to move along the traversing leg T of the path P. In such manner, the cutting bit 16 is moved toward the rotational axis A along a plane normal to the rotational axis A of the tube T, from the dashed line to solid line positions shown in FIG. 11.

Then, the upper plate 38 of the upper slide mechanism 30 is moved causing the cutting bit 16 to move along the facing leg F of the path P. In such manner, the cutting bit 16 is moved away from the rotational axis A of the tube T, from the dashed line to solid line positions shown in FIG. 12. Such movement of the cutting bit 16 causes its other face 16B to sever a final portion of the end E of the rotating tube T in a direction from the inside to the outside of the tube end E at an acute angle, such as fifteen degrees, to a plane normal to the rotational axis A of the rotating tube T and thereby provide a substantially burr-free final face FF on the tube end E extending in a plane normal to the rotational axis A.

Finally, both the upper plate 38 and top plate 44 of the upper and lower slide mechanisms 30, 32 are moved so as to cause the cutting bit 16 to move along the retracting leg R of the path P. In such manner, the cutting bit 16 is moved back to a home position H, from the dashed line to solid line positions seen in FIG. 13.

Thus, it will be readily understood the cutting bit 16 having multiple cutting faces 16A, 16B, 16C uses a different one of the faces in severing the initial portion of the rotating tube T than it uses in severing the final portion thereof.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. An apparatus for finishing an end of a rotating hollow tube, said finishing apparatus comprising:
   (a) a cutting bit;
   (b) means for supporting the cutting bit adjacent to the end of the rotating tube; and
   (c) means for moving the supporting means and thereby the cutting bit relative to the end of the rotating tube along a closed polygonal path of travel;
   (d) said moving means being capable of moving said supporting means and cutting bit along said path of travel from a home position and in a direction from the outside to the inside of the tube in which an initial portion of the rotating tube is severed at an angle to a plane normal to the rotational axis of the tube so as to define an initial cut face on the tube end extending in inclined relation to the rotational axis of the tube;

(e) said moving means being further capable of moving said supporting means and cutting bit along said path of travel in a direction from the inside to the outside of the tube and back to the home position in which a final portion of the rotating tube is severed at another angle to the normal plane so as to define a final cut face on the tube end extending normal to the rotational axis of the tube.

2. The apparatus as recited in claim 1, wherein said cutting bit has multiple cutting faces with a different one of the faces being employed in severing the initial portion of the rotating tube than is used in severing the final portion thereof.

3. The apparatus as recited in claim 1, wherein said supporting means is a movable platform mounting said cutting bit.

4. The apparatus as recited in claim 3, wherein said moving means includes:

a pair of upper and lower slide mechanisms;

said upper slide mechanism mounting said platform and being actuatable to move said platform and said cutting bit therewith along said closed path of travel;

said lower slide mechanism mounting said upper slide mechanism and being actuatable to actuate said upper slide mechanism and thereby to move said platform and said cutting bit therewith along said closed path of travel; and means for actuating said upper and lower slide mechanisms.

5. The apparatus as recited in claim 4, wherein said slide mechanism actuating means includes:

a rotatable drive shaft;

a pair of upper and lower cams mounted one above the other to said drive shaft for rotation therewith, each of said cams having a peripheral lobe thereon; and a pair of upper and lower cam followers respectively mounted to said upper and lower slide mechanisms and engaged with said peripheral lobes on said cams;

said peripheral lobes being configured to move said cam followers and actuate said upper and lower slide mechanism so as to cause movement of said cutting bit along said closed path of travel.

6. The apparatus as recited in claim 5, further comprising:

a housing disposed in sealed relationship with said movable platform and defining a chamber for containing said upper and lower slide mechanisms and said cams and cam followers in isolated relationship with respect to said cutting bit.

7. The apparatus as recited in claim 5, wherein said upper slide mechanism includes:

a lower plate; and an upper plate mounted to said lower plate for reciprocal movement relative thereto, said upper plate mounting said upper cam follower and said platform.

8. The apparatus as recited in claim 7, wherein said lower slide mechanism includes:

a stationary bottom plate; and a top plate mounted to said bottom plate for reciprocal movement relative thereto, said top plate mounting said lower plate of said upper slide mechanism for movement with said top plate.

9. The apparatus as recited in claim 8, wherein each of said upper and lower slide mechanisms includes a pneumatic cylinder connected to said corresponding one of said upper and top plates and being operable to impose a force thereon biasing said cam follower mounted to said respective plate into engagement with said corresponding one of said upper and lower cams.

10. The apparatus as recited in claim 9, further comprising:

a housing disposed in sealed relationship with said movable platform and defining a chamber for containing said upper and lower slide mechanisms and said cams and cam followers in isolated relationship with respect to said cutting bit, said bottom plate of said lower slide mechanism being mounted to said housing.

11. An apparatus for finishing an end of a rotating hollow tube, said finishing apparatus comprising:

(a) a cutting bit having multiple cutting faces;

(b) a platform supporting said cutting bit adjacent to the end of the rotating tube; and (c) means for moving said platform and thereby said cutting bit relative to the end of the rotating tube along a closed path of travel including (i) a cutting leg in which said moving means is capable of moving said cutting bit from a home position and from the outside to the inside of the rotating tube to sever an initial portion of the tube end at an acute angle to a plane normal to the rotational axis of the tube so as to define an initial cut face on the tube end extending in inclined relation to a plane normal to the rotational axis of the tube, (ii) a traversing leg in which said moving means is capable of moving said cutting bit toward the rotational axis of the tube in a plane normal to the rotational axis of the tube, (iii) a facing leg in which said moving means is capable of moving said cutting bit from the inside to the outside of the rotating tube to sever a final portion of the tube end at an acute angle to a plane normal to the rotational axis of the tube so as to provide a substantially burr-free cut face on the tube end extending in a plane normal to the rotational axis of the tube, and (iv) a retracting leg in which said moving means is capable of moving said cutting bit away from the rotational axis of the tube and back to said home position of the cutting bit.

12. The apparatus as recited in claim 11, wherein said moving means includes:

a pair of upper and lower slide mechanisms;

said upper slide mechanism mounting said platform and being actuatable to move said platform and said cutting bit therewith about said closed path of travel;

said lower slide mechanism mounting said upper slide mechanism and being actuatable to actuate said upper slide mechanism and thereby to move said platform and said cutting bit therewith about said closed path of travel; and means for actuating said upper and lower slide mechanisms.

13. The apparatus as recited in claim 11, wherein said slide mechanism actuating means includes:

a rotatable drive shaft;

a pair of cams mounted one above the other to said drive shaft for rotation therewith, each of said cams having a peripheral lobe thereon; and a pair of cam followers respectively mounted to said upper and lower slide mechanisms and engaged with said peripheral lobes on said cams;

said peripheral lobes being configured to move said cam followers and actuate said upper and lower slide mechanism so as to cause movement of said cutting bit about said closed path of travel.

14. The apparatus as recited in claim 13, further comprising:

a housing disposed in sealed relationship with said movable platform and defining a chamber for containing said upper and lower slide mechanisms and said cams and cam followers in isolated relationship with respect to said cutting bit.

15. The apparatus as recited in claim 13, wherein said upper slide mechanism includes:

a lower plate; and an upper plate mounted to said lower plate for reciprocal movement relative thereto, said upper plate mounting said upper cam follower and said platform.

16. The apparatus as recited in claim 15, wherein said lower slide mechanism includes:

a stationary bottom plate; and a top plate mounted to said bottom plate for reciprocal movement relative thereto, said top plate mounting said lower plate of said upper slide mechanism for movement with said top plate.

17. The apparatus as recited in claim 16, wherein each of said upper and lower slide mechanisms includes a pneumatic cylinder connected to said corresponding one of said upper and top plates and being operable to impose a force thereon biasing said cam follower mounted to said respective plate into engagement with said corresponding one of said upper and lower cams.

18. The apparatus as recited in claim 17, further comprising:

a housing disposed in sealed relationship with said movable platform and defining a chamber for containing said upper and lower slide mechanisms and said cams and cam followers in isolated relationship with respect to said cutting bit, said bottom plate of said lower slide mechanism being mounted to said housing.

19. A method for finishing an end of a rotating hollow tube, said finishing method comprising the steps of:

(a) supporting a cutting bit adjacent to the end of the rotating tube; and (b) moving the cutting bit relative to the end of the rotating tube along a closed polygonal path of travel, initially, in a direction from the outside to the inside of the tube in which an initial portion of the rotating tube is severed at an angle to a plane normal to the rotational axis of the tube so as to define an initial cut face on the tube end extending in inclined relation to a plane normal to the rotational axis of the tube, and, thereafter, in a direction from the inside to the outside of the tube in which a final portion of the rotating tube is severed at an another angle to the normal plane so as to define a final cut face on the tube end extending in a plane normal to the rotational axis of the tube.

20. The method as recited in claim 19, further comprising the step of:

employing a cutting bit having multiple cutting faces with a different one of the faces being used in severing the initial portion of the rotating tube than is used in severing the final portion thereof.

21. A method for finishing an end of a rotating hollow tube, said finishing method comprising the steps of:

(a) supporting a cutting bit adjacent to the end of the rotating tube; and (b) moving the cutting bit relative to the end of the rotating tube along a closed polygonal path of travel, (i) first, from a home position along a cutting leg of the path to sever an initial portion of the tube end is in a direction from the outside to the inside of the rotating tube at an acute angle to a plane normal to the rotational axis of the tube so as to define an initial cut face on the tube end extending in inclined relation to a plane normal to the rotational axis of the tube, (ii) second, along a traversing leg of the path toward the rotational axis of the tube in a plane normal to the rotational axis of the tube, (iii) third, along a facing leg of the path to sever a final portion of the tube end in a direction from the inside to the outside of the rotating tube at an acute angle to a plane normal to the rotational axis of the tube so as to provide a substantially burr-free cut face on the end of the tube extending in a plane normal to the rotational axis of the tube, and (iv) fourth, along a retracting leg of the path away from the rotational axis of the tube back to the home position of the cutting bit.

22. The method as recited in claim 21, further comprising the step of:

employing a cutting bit having multiple cutting faces with a different one of the faces being used in severing the initial portion of the rotating tube than is used in severing the final portion thereof.

* * * * *